United States Patent [19]
McGuire

[11] Patent Number: 4,575,202
[45] Date of Patent: Mar. 11, 1986

[54] REARVIEW MIRROR FOR VEHICLES

[76] Inventor: Arthur M. McGuire, High Spire Apartments, Apartment 100, High Spire, Pa. 17034

[21] Appl. No.: 544,074

[22] Filed: Oct. 21, 1983

[51] Int. Cl.[4] .............................................. G02B 5/10
[52] U.S. Cl. .................................... 350/627; 350/615
[58] Field of Search ............... 350/615, 627, 281, 278, 350/606, 631; 248/481, 484, 475 R; D12/187

[56] References Cited

U.S. PATENT DOCUMENTS

| | | | |
|---|---|---|---|
| 1,440,401 | 1/1923 | May | 248/484 |
| 1,455,441 | 5/1923 | La Hodny | 248/484 |
| 2,128,187 | 8/1938 | Kondrath | 248/484 |
| 2,605,676 | 8/1952 | Couch | 350/615 |
| 2,869,425 | 1/1959 | Kershaw | 350/627 |
| 3,096,061 | 7/1963 | Bertell | 248/481 |
| 4,331,382 | 5/1982 | Graff | 350/627 |

Primary Examiner—John K. Corbin
Assistant Examiner—Loha Ben
Attorney, Agent, or Firm—John F. A. Earley; John F. A. Earley, III

[57] ABSTRACT

Rearview mirror apparatus for automobiles that eliminates the blind spots to the left rear and to the right rear of the automobile comprising a housing holding a mirror having a center mirror portion which is flat so as to reflect images of vehicles located directly behind the driver of the automobile, a left mirror portion which is curved toward the housing so as to reflect images of vehicles located in the left blind spot, and a right mirror portion which is curved so as to reflect images of vehicles located in the right blind spot. The rearview mirror may be mounted on an existing rearview mirror or may replace it.

5 Claims, 8 Drawing Figures

REARVIEW MIRROR FOR VEHICLES

TECHNICAL FIELD

This invention relates to rearview mirrors for automotive vehicles that are designed to eliminate the blind spots which exist in conventional rearview mirrors at the left rear and at the right rear of the automobile.

BACKGROUND OF THE PRIOR ART

It is well-known that the driver of an automobile has a blind spot to the right rear and to the left rear, over his left and right shoulders, where he cannot see a vehicle in the next lane approaching from behind. He can see the approaching vehicle in the conventional rearview mirror, but as it draws near it disappears from view in the mirror and cannot be seen. If he then turns into the next lane, he may strike the approaching vehicle and cause an accident.

A number of attempts have been made to solve this problem.

Moller, U.S. Pat. No. 3,411,843, discloses a composite rearview mirror that comprises three substantially flat mirror segments, including a central mirror segment for viewing the area directly behind the vehicle, a left mirror segment for viewing the area to the right rear of the automobile, and a right mirror section for viewing the area to the left rear of the automobile. However, the Moller arrangement is more complex than the present invention; it provides three mirrors instead of one; and it may be somewhat confusing since the right mirror section reflects the left rear and the left mirror section reflects the right rear.

Lenta, U.S. Pat. No. 2,649,028, provides a rearview mirror for use on automobiles and the like which includes three independently adjustable viewing faces. This device is also more complicated than the present invention and provides three separate mirrors instead of one.

BRIEF SUMMARY OF THE INVENTION

It is an object of the present invention to provide a rearview mirror that provides the driver with a view of any vehicles approaching from directly behind the driver, and also provides a view of any vehicles approaching in the next lane from the left rear or from the right rear of his vehicle which would normally be unobserved because they would be located in the blind spots of a conventional rearview mirror.

It is another object to provide such a rearview mirror which is simple in construction and may be adjusted easily to suit each individual driver, and which includes a single mirror, rather than multiple mirrors.

DETAILED DESCRIPTION

Figure 1:
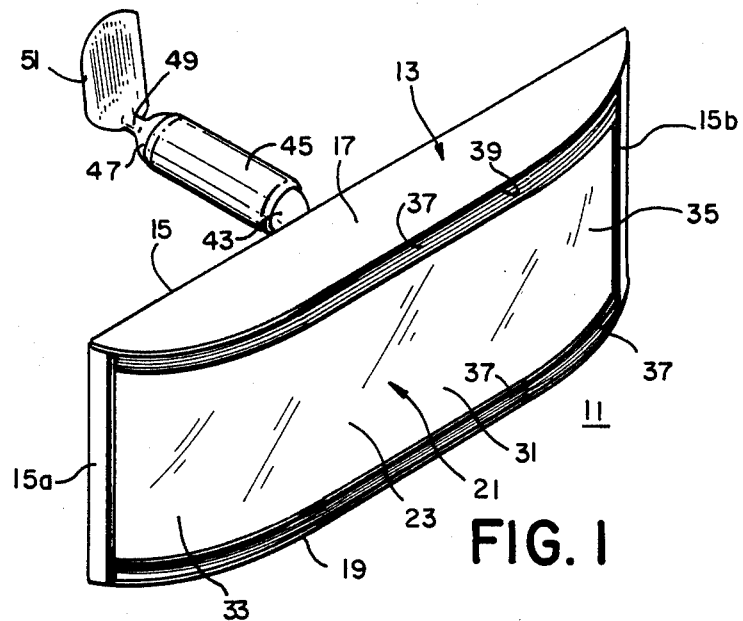
FIG. 1 is a view in perspective of a rearview mirror constructed in accordance with the invention.
Figure 2:
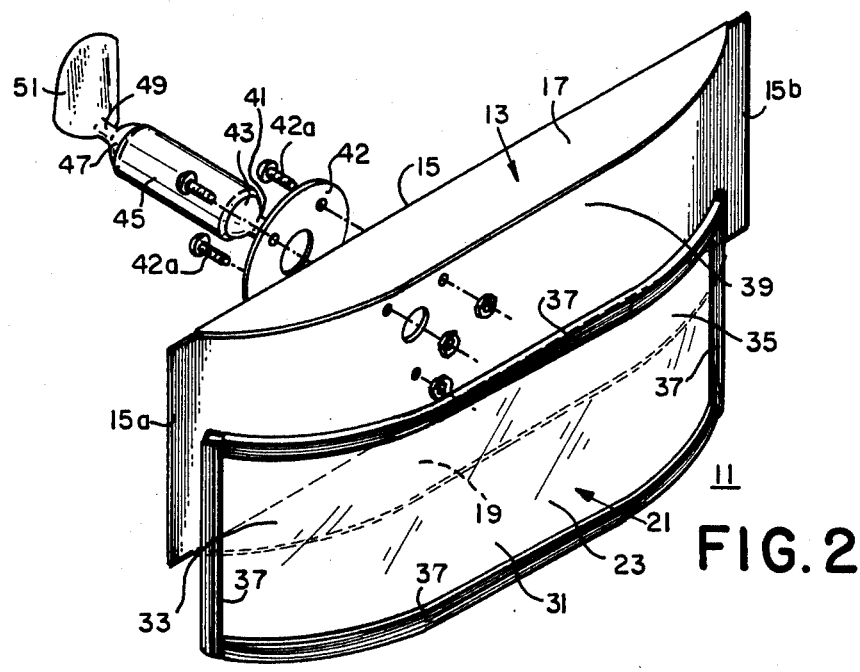
FIG. 2 is a disassembled view of the rearview mirror of FIG. 1.

Turning now to the drawings, there is shown a rearview mirror apparatus 11 that eliminates the blind spots to the left rear and to the right rear of an automobile. The rearview mirror apparatus 11 is adapted to be mounted on or adjacent to the windshield of the automobile at about the center.

Rearview mirror apparatus 11 comprises a housing 13 having a back plate 15 with side panels 15a and 15b, an upper panel 17 curved toward both ends, and a lower panel 19 curved toward both ends in a similar manner. A mirror 21 is mounted in housing 13.

Figure 3A:
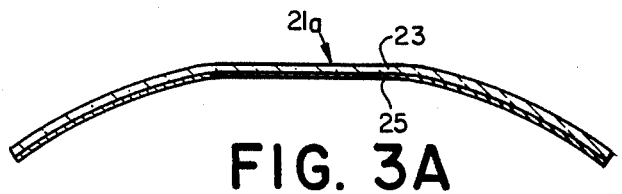
FIG. 3A is a view in horizontal section showing the end curvature of one embodiment of the mirror of this invention.

The mirror may be mirror 21a in FIG. 3A which includes a glass or clear synthetic body sheet 23 and reflecting surface sheet 25 silvered onto the back of sheet 23.

Figure 3B:
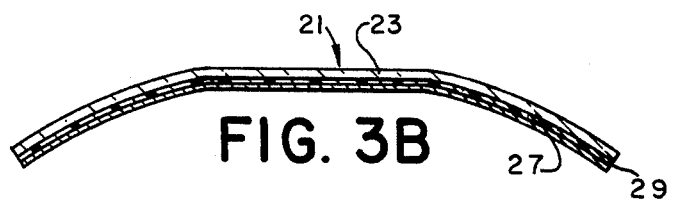
FIG. 3B is a view in horizontal section showing the end curvature of another embodiment of the inventive mirror.
Figure 4:
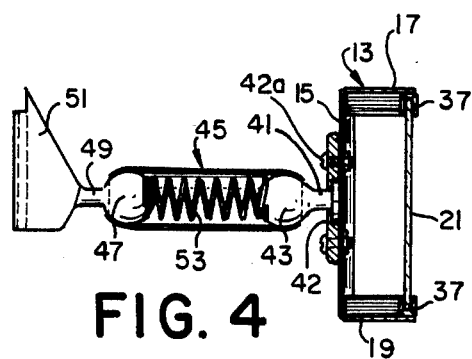
FIG. 4 is a view in side elevation and in section of the rearview mirror apparatus of the invention.
Figure 5:
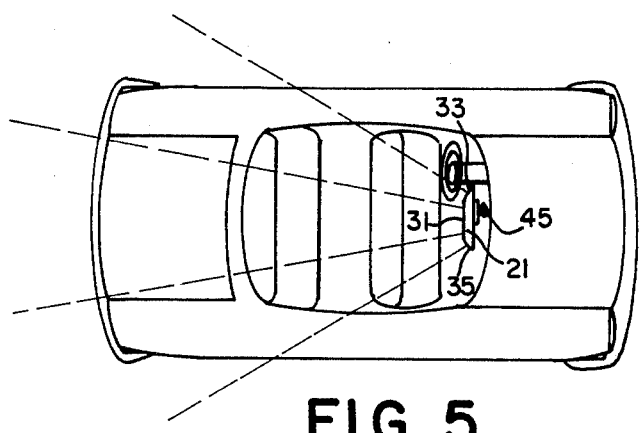
FIG. 5 is a diagrammatic view in top plan of the mirror installed in an automobile with lines indicating sectors of view directly behind, left rear, and right rear.

In the preferred embodiment of the invention shown in FIG. 3B, mirror 21 comprises a reflecting tape 27 attached to the back of glass or clear synthetic plastic body sheet 23 by an adhesive layer 29. Tape 27 may be a reflecting tape made by the 3M Company, St. Paul, Minn.

Mirror 21 has a center portion 31 which is flat so as to reflect images of vehicles located directly behind the driver of the automobile. Mirror 21 also has a left mirror portion 33 which is curved at its left end toward the housing back plate 15 so as to reflect images of vehicles located in the left lane and especially the left blind spot of the driver, and also has a right mirror portion 35 which is curved at its right end toward the housing back plate 15 so as to reflect images of vehicles located in the right lane and especially in the right blind spot of the driver.

The preferable dimensions of mirror 21 are about 3 inches high, the center portion 31 of the mirror being about 3 inches wide, and left and right mirror portions 33, 35 being about 2½ inches wide and curved about a 6¾ inch vertical radius.

Mirror 21 is seated in a resilient gasket 37 made of rubber, or other resilient material, that is positioned around the periphery of housing opening 39. A stem 41 extends from a bracket 42 mounted by bolts 42a on the back plate 15 of housing 13, and a ball 43 is mounted on the end of stem 41 and is seated in an end of sleeve 45. A second ball 47 is seated in the other end of sleeve 45 and has a stem 49 extending therefrom which is attached to a mounting plate 51 for mounting on the dashboard or windshield, or other convenient surface, of an automobile. A spring 53 is positioned within sleeve 45 between the balls 43, 47 to exert force against the balls to hold them in an adjustable seated position to, in turn, hold the mirror in an adjustable position that may be changed to suit the individual driver.

The conventional rearview mirror which comes with the automobile may be removed easily and replaced by the inventive rearview mirror.

Figure 6:
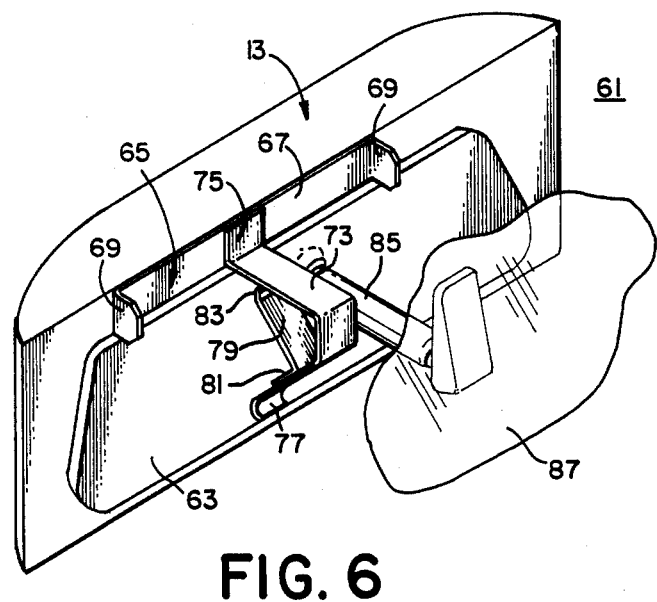
FIG. 6 is a view in perspective showing another embodiment of the invention from the rear of the mirror.
Figure 7:
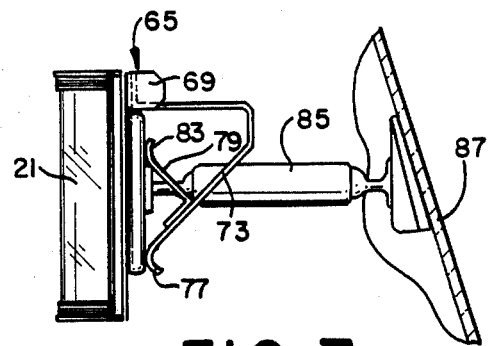
FIG. 7 shows the mirror of FIG. 6 in side elevation and partly in section.

Turning now to FIGS. 6 and 7 of the drawings, they show rearview mirror apparatus 61 which includes means for attaching mirror housing 13 to an existing rearview mirror 63 without having to remove that mirror. Mirror 21 and its housing 13 are easily and removably slipped onto existing mirror 63.

The means for attaching housing 13 onto existing mirror 63 comprises a bracket 65 that includes a horizontal cross bar 67 attached to the back of housing 13 near the top. A positioning tab 69 extends rearwardly from each end of horizontal cross bar 67 to engage the top edge of existing mirror 63 to horizontally position the mirror housing 13 and to keep the two mirrors 21, 63 parallel to each other.

A first vertically positioned spring 73 has one end 75 fixed to horizontal plate or cross bar 67 and has a free end 77 which is curled rearwardly and which contacts the rear of existing mirror 63 to hold the housing 13 in place. A second vertically positioned spring 79 has one end 81 fixed to the first vertical spring 73 and has a free end 83 which is curved rearwardly and which contacts the rear of existing mirror 63 to assist in holding the housing 13 in place.

Bracket 65 is offset from the center of housing 13 so as to accommodate the mounting bracket 85 of existing mirror 63 to mount the removable mirror 21 evenly on the existing mirror 63 so that the centerlines of the two mirrors are substantially in coincidence. Mounting bracket 85 is shown attached to the interior surface of windshield 87 of the automobile.

With the inventive rearview mirror, the driver can look at both sides of his vehicle with one look; he does not have to look at a center rearview mirror and then turn his head to look at a sideview mirror; and the usual blind spots of the center rearview mirror are eliminated.

I claim:

1. Rearview mirror apparatus for automobiles that eliminates the blind spots to the left rear and to the right rear of the automobile and is adapted to be mounted on or adjacent to the windshield of the automobile at about the center, comprising a mirror housing having a back plate and upper, lower, and side panels extending therefrom, a mirror having a body sheet and a reflecting surface sheet, said mirror having a center portion which is flat so as to reflect images of vehicles located directly behind the driver of the automobile, said mirror having a left mirror portion which is curved at its left end toward the housing back plate so as to reflect images of vehicles located in the left lane and especially in the left blind spot, and said mirror having a right mirror portion which is curved at its right and toward the housing back plate so as to reflect images of vehicles located in the right lane and especially in the right blind spot, and means for attaching the mirror housing to an automobile comprising a bracket mounted on the rear of the mirror housing for easily and removably slipping onto an existing rearview mirror mounted on the automobile, said bracket including a horizontal cross bar attached to the back of the housing near the top, a positioning tab extending rearwardly from each end of the horizontal cross bar to engage the top edge of the existing mirror to horizontally position said mirror housing and keep the two mirrors parallel to each other, a first vertically positioned spring having one end fixed to the horizontal cross bar and having a free end which contacts the rear of the existing mirror to hold the housing in place, and a second vertically positioned spring having one end fixed to the first vertical spring and having a free end which contacts the rear of the existing mirror to assist in holding the housing in place.

2. The rearview mirror apparatus of claim 1, said bracket being offset from the center of the housing so as to accommodate the mounting bracket of the existing mirror and yet mount the removable mirror evenly on the existing mirror so their centerlines substantially coincide.

3. Rearview mirror apparatus for automobiles that eliminates the blind spots to the left rear and to the right rear of the automobile and is adapted to be easily and removably slipped onto an existing rearview mirror mounted in the automobile, comprising a mirror housing having a back plate and upper and lower panels extending therefrom, a mirror having a body sheet and a reflecting surface sheet, said mirror having a center mirror portion which is flat so as to reflect images of vehicles located directly behind the driver of the automobile, said mirror having a left mirror portion which is curved at its left end toward the housing back plate so as to reflect images of vehicles located in the left blind spot, said mirror having a right mirror portion which is curved at its right end toward the housing back plate so as to reflect images of vehicles located in the right blind spot, and means for attaching the mirror housing to an existing rearview mirror mounted on the automobile comprising a bracket mounted on the rear of the mirror housing for easily and removably slipping onto the existing rearview mirror, said bracket including a horizontal cross bar attached to the back of the housing near the top, a positioning tab extending rearwardly from each end of the horizontal cross bar to engage the top of the existing mirror to horizontally position said mirror housing and keep the two mirrors parallel to each other, a first vertically positioned spring having one end fixed to the horizontal plate and having a free end which contacts the rear of the existing mirror to hold the housing in place, and a second vertically positioned spring having one end fixed to the first vertical spring and having a free end which contacts the rear of the existing mirror to assist in holding the housing in place, said bracket being offset from the center of the housing so as to accommodate the mounting bracket of the existing mirror and yet mount the removable mirror evenly on the existing mirror so that the centerlines substantially coincide.

4. The rearview mirror apparatus of claim 3, the reflecting surface sheet of the mirror being a silvered sheet which was silvered onto the back of the mirror body sheet to provide a reflecting surface.

5. The rearview mirror apparatus of claim 3, the reflecting surface sheet of the mirror being a reflecting tape attached to the back of the mirror body sheet by an adhesive sheet.

* * * * *